United States Patent [19]

Chiou et al.

[11] Patent Number: 5,740,450
[45] Date of Patent: Apr. 14, 1998

[54] METHOD TO AUTOMATICALLY DETECT THE INTERRUPT CHANNEL STATUS OF AN ADD-ON CARD

[75] Inventors: Jeng-Fang Chiou, Pin-Chan; Su-Chu Lin, Chu-Tong, both of Taiwan

[73] Assignee: United Microelectronics Corporation, Taipei, Taiwan

[21] Appl. No.: 690,333

[22] Filed: Jul. 26, 1996

Related U.S. Application Data

[63] Continuation-in-part of Ser. No. 280,622, Jul. 26, 1994, abandoned.

[51] Int. Cl.$^6$ .................................................. G06F 9/22
[52] U.S. Cl. ........................................................ 395/733
[58] Field of Search .................................... 395/733–742, 395/183.19; 371/57.1

[56] References Cited

U.S. PATENT DOCUMENTS

| | | | |
|---|---|---|---|
| 4,514,845 | 4/1985 | Starr | 395/183.19 |
| 5,014,193 | 5/1991 | Garner et al. | 395/830 |
| 5,111,423 | 5/1992 | Kopec, Jr. et al. | 395/500 |
| 5,138,257 | 8/1992 | Katsuka | 395/183.19 |
| 5,161,102 | 11/1992 | Griffin et al. | 395/800 |
| 5,280,618 | 1/1994 | Takagi | 395/733 |
| 5,353,432 | 10/1994 | Richek | 395/500 |
| 5,373,514 | 12/1994 | Ma | 395/183.19 |

*Primary Examiner*—Jack B. Harvey
*Assistant Examiner*—Paul R. Myers
*Attorney, Agent, or Firm*—Barnes,Kisselle,Raisch,Choate,Whittemore & Hulbert, P.C.

[57] ABSTRACT

A method to automatically detect the interrupt channel status of an add-on card by providing an IRQ set port, an IRQ status port, and an IRQ force port on the card wherein the IRQ set port is used to preset an interrupt channel code of the card, the IRQ status port is used to read the present status of the interrupt channel, and the IRQ force port is used to ground the interrupt channel through a resistor when the logic is "1", and not to ground the interrupt channel when the logic is "0".

6 Claims, 2 Drawing Sheets

METHOD TO AUTOMATICALLY DETECT THE INTERRUPT CHANNEL STATUS OF AN ADD-ON CARD

RELATED U.S. APPLICATION DATA

This is a continuation-in-part application of application Ser. No. 08/280,622, filed 26 Jul. 1994, now abandoned.

FIELD OF THE INVENTION

The present invention relates generally to a method of automatically detecting the interrupt channel status of an add-on card and more particularly it is related to a method to automatically detecting the interrupt channel status of an add-on card by sensing the voltage position of the interrupt channel.

BACKGROUND OF THE INVENTION

In recent development of personal computers, add-on cards are frequently used to expand the capability of the computer. When a customer desires to add a feature to his/her personal computer, for example to use a scanner or other device, or to provide the computer with video capabilities, add-on cards are used. They are plugged in the motherboard of the personal computer and play the part of an interface between the computer and the added peripheral device. The add-on cards are normally equipped with at least one interrupt channel. The selection of an interrupt condition is usually performed by a function instruction that can select occurrences of address, data, and channel transmission parity errors. Associated with each channel, there is usually a special register in a channel unit which indicates the occurrence of one or more of these conditions. There is usually one bit in the register for each equipment condition. Additional bits are reserved for the use of the channel itself, such as an interrupt from the channel, channel data parity error, or control word parity errors.

Generally, two different types of hardware interrupt are distinguishable, the non-maskable interrupt NMI and the maskable interrupt request IRQ. The IRQ is normally used with a PIC8259 interrupt controller. When the computer issues an NMI, the processor's NMI connection is supplied with a signal. The processor completes the current instruction and issues an interrupt. In a personal computer, NMI is issued if a parity error occurs during the course of a memory reading. A characteristic of NMI is that it cannot be masked. NMI always takes priority because NMI is usually only issued in connection with a serious hardware malfunction.

IRQ interrupt requests can be masked off by clearing an interrupt flag IE. The interrupts are enabled again only when opposite instruction STI has been issued. Normally, interrupt requests are issued by a peripheral, for instance, when a serial interface wants to inform the processor that it has just received a character.

When more than one add-on card is used in a personal computer, it is possible that the interrupt channels used on the two cards are the same that will cause interference between the two cards. This type of interference frequently leads to computer down time. Furthermore, when a personal computer inspects its interrupt channels, i.e. during a process of inspecting terminals D0 to D7 on a 8259A chip, faulty results are frequently obtained due to noise signals presented in the voltage reading.

When an add-on card is connected to a personal computer, it is impossible to inspect and discover whether the interrupt channel used is in conflict with other add-on cards. It is also impossible to detect among the interrupt channels, which ones are being used and which ones are not being used. It is therefore a common problem incurred in the use of personal computers to identify the status of usage of the interrupt channels. It is also a problem to avoid the use of the interrupt channel that is common with the interrupt channel on another add-on card. This has been a deficiency that the add-on card manufacturers have attempted to fix for many years since computer down time is not infrequently the result of such deficiency.

Others have proposed solutions to this problem by inspecting the output content of an interrupt controller (i.e., a 8259A chip) or to actually produce an interrupt. These procedures frequently cause a computer add-on card that has an interrupt channel in use to go down or to produce errors during such procedures.

It is therefore an object of the present invention to provide a method to automatically detect the interrupt channel status of an add-on card that does not have the shortcomings of the prior art methods.

It is another object of the present invention to provide a method to automatically detect the interrupt channel status of an add-on card in order to detect any interference with the interrupt channel used by other add-on cards.

It is further object of the present invention to provide a method to automatically, detect the interrupt channel status of an add-on card in order to detect which ones of the interrupt channels are being used and which ones of the interrupt channels are not being used.

It is yet another object of the present invention to provide a method to automatically detect the interrupt channel status of an add-on card by analyzing signals on each interrupt channel connected to an interrupt controller without interfering with signals on those interrupt channels that are currently in use.

SUMMARY OF THE INVENTION

In accordance with the present invention, a method to automatically detect an interrupt channel status of an add-on card is provided.

In the preferred embodiment, three I/O ports are provided for the add-on card which include the IRQ set port, the IRQ status port, and the IRQ force port. The method further utilizes a program executed by the CPU to determine the conditions of the interrupt channels.

The present invention detection method provides the steps of detecting whether each of the interrupt channels is in use and detecting whether a certain interrupt channel is in conflict with other interrupt channels on another add-on card.

Specifically, a method to automatically detect a use status of an interrupt channel on a personal computer add-on card equipped with an IRQ set port, an IRQ status port, and an IRQ force port, comprises according to the present invention the steps of disabling an interrupt request on a central processing unit of the personal computer; presetting a number of data input into the IRQ status port, the data characterizing a use status of the interrupt channel to be detected; reading the preset number of data input into the IRQ status port; executing a logic "and" calculation of a result of reading the preset number of data input and a data characterizing a current status of the interrupt channel; and repeating reading and calculating for a predetermined number of times; writing a result from the calculation into the IRQ force port and reading data from the IRQ status port designating the interrupt channel as an unused interrupt channel if there is logic "1" in the IRQ force port and logic "0" in the IRQ status port; writing logic "0" into the IRQ force port; and activating an interrupt channel gate of the central processing unit.

The IRQ set port is used to preset an interrupt channel code of the add-on card, the IRQ status port is used to directly read the present status of the interrupt channel, and the IRQ force port is used to ground the interrupt channel through a resistor when the channel has logic "1" and not to ground when the channel has logic "0".

The resistor for grounding is a 1,000 Ohm resistor.

According to another aspect of the present invention, in a personal computer system with at least one add-on card, the at least one add-on card being equipped with an IRQ set port, an IRQ status port, and an IRQ force port, a method to automatically detect the use status of a plurality of interrupt channels comprises the steps of disabling an interrupt channel request on a central processing unit of the personal computer; presetting a number of data for a first interrupt channel of the plurality of interrupt channels into the IRQ status port, the data characterizing a use status of the interrupt channel to be detected; reading the preset number of data input from the IRQ status port; executing a logic "and" calculation of a result of reading and data characterizing a current status of the interrupt channel, and replacing the current status data with the calculation result; repeating steps of reading and calculating for a predetermined number of times; writing a result of repeating into the IRQ force port and reading data from the IRQ status port, thus defining the first interrupt channel as an unused interrupt channel if there is logic "1" in the IRQ force port and logic "0" in the IRQ status port; writing logic "0" into the IRQ force port; performing the above steps of presetting, reading, calculating, repeating reading and calculating, writing a result of repeating and reading data for other interrupt channels of the plurality; switching the at least one add-on card to the first interupt channel, if the first interrupt channel is not in use, or switching the at least one add-on card to next unused interrupt channel of the plurality, if the first interrupt channel is in use; and activating the interrupt channel request of the central processing unit.

BRIEF DESCRIPTION OF THE DRAWINGS

Other objects, features and advantages of the present invention will become apparent upon consideration of the detailed specification and the appended drawings, in which.

DETAILED DESCRIPTION OF THE PREFERRED EMBODIMENT

The present invention discloses a method to automatically detect the interrupt channel status of an add-on card by detecting the voltage level of the interrupt channel.

Before an interrupt channel has been used, a signal is provided to the interrupt channel from the interrupt controller (an 8259A chip) of the personal computer through a 1,000 Ohm resistor. The signal carries a voltage that floats high near $V_{cc}$, if no interrupting device (controller) is connected. If an interrupting device is connected, it drives this interrupt line (channel) low before providing any interrupts such that when an interrupt event occurs, it uses smaller than 1,000 Ohm resistance to drive the interrupt channel to high in order to notify the interrupting device that there is an interrupt request. The interrupt controller is capable of detecting an interrupt request through this change from low voltage to high voltage in the channel.

From the above procedure the following can be determined:

When the voltage of an interrupt signal is a low voltage, the interrupt channel is not in use.

When the voltage of an interrupt signal is a high voltage, the interrupt signal can be driven by a 1,000 Ohm grounded resistor in order to determine whether the interrupt channel is in use. When the interrupt channel is not in use, the high voltage signal driven by the interrupt channel changes to a low voltage. When the interrupt channel is in use, the interrupt channel maintains its high voltage and is not affected by the signal sent out from the add-on card. By following this procedure, the add-on cards that are in use or not in use can be easily distinguished. Furthermore, the added resistor does not affect the operation of the add-on card.

Figure 1:
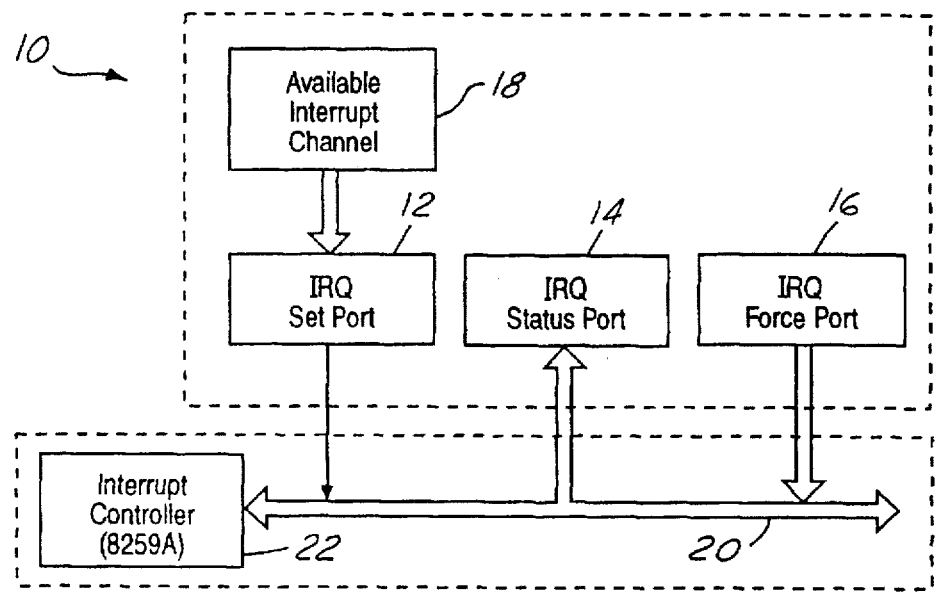
FIG. 1 is a block diagram illustrating the present invention.

Referring initially to FIG. 1, three special I/O ports are shown on an add-on card 10. These are an IRQ set port 12, an IRQ status port 14, and an IRQ force port 16. The IRQ set port 12 accepts input from an available interrupt channel 18 while the IRQ force port 16 feeds into tan interrupt channel 18 that is in use and is connected to an interrupt controller 22. The former port 12 connects the add-on card to the interrupt channel, whereas the latter port 16 defines if the interrupt channel is in use or not. A program is run by a central processing unit (not shown) in order to determine the status of the interrupt channel 20. The interrupt channel 18 belongs to the add-on card 10, the interrupt channel 20 presents an interrupt line (not shown). There usually exists a means responsible for monitoring interrupt conditions, with a set of code bits used for a registering of equipment conditions. Some of these code bits are used for coding interrupt channels. The IRQ set port 12 is used to preset the code of the interrupt channel on the add-on card that is necessary to distinguish an interrupt channel from another one. The code is understood to be an occurrence of a specific address, data, and/or channel transmission parity errors characteristic for the interruption. The selection of occurrences of the address and data, as well as channel transmission parity errors specific for the interruption is usually performed through the use of a corresponding function instruction. The IRQ set port 12 plays the part of a means responsible for setting a code of an interrupt channel to distinguish one interrupt channel from another. The IRQ status port 14 is used to directly read the present signal status, i.e., a high voltage as logic "1" or a low voltage as logic "0", into the interrupt channel. The IRQ force port 16 utilizes a 1,000 Ohm grounding resistor (not shown) for conducting when the interrupt channel has logic "1", or does not use the resistor when the interrupt channel has logic "0".

Figure 2:
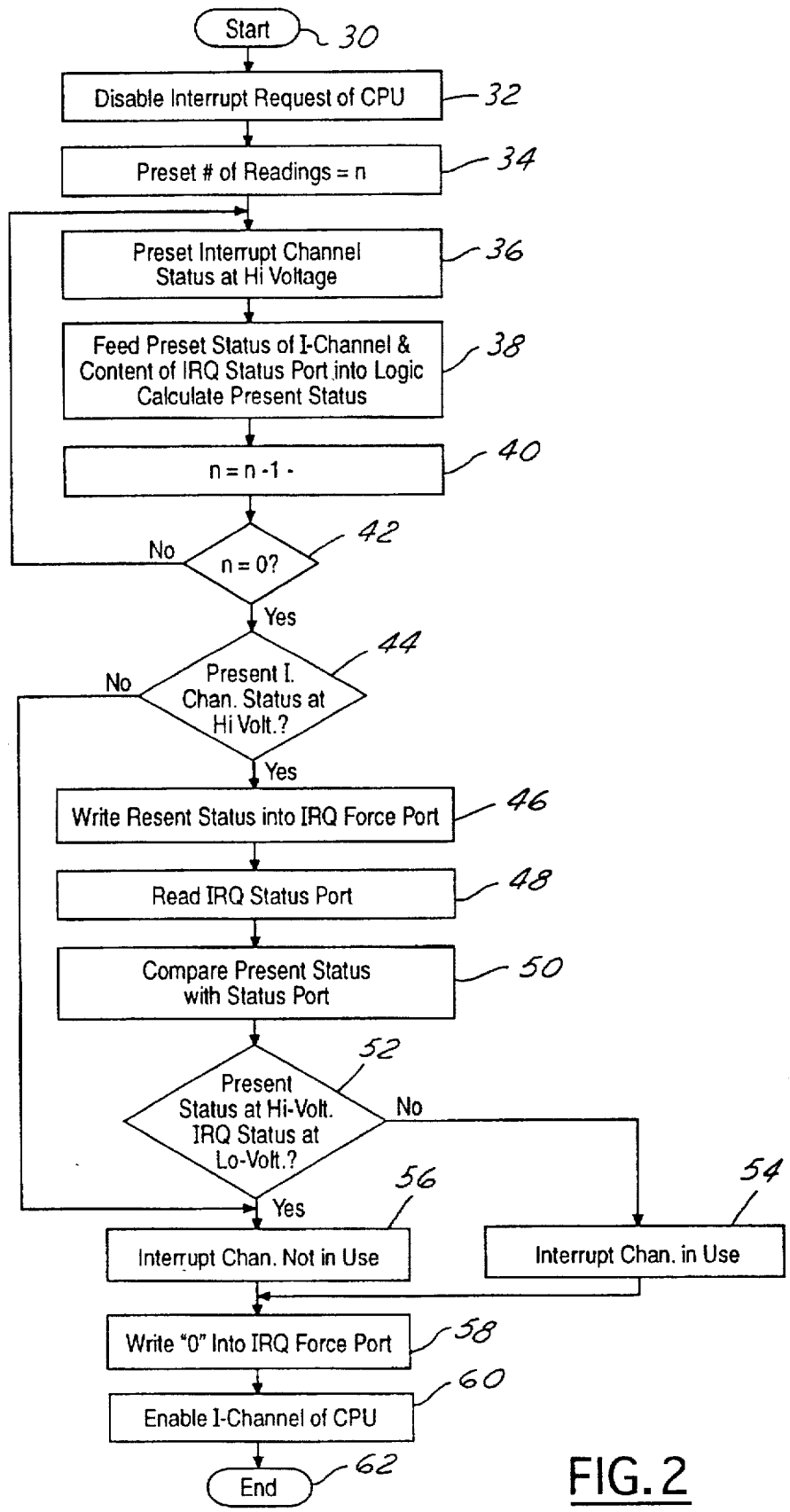
FIG. 2 is a flow chart for the program used by the present invention to detect whether an interrupt channel is being used.

The present invention detection method is also executed by the program which detects the use status of every interrupt channel and also detects, for a specific interrupt channel, whether it is in conflict with other add-on cards. The program can be illustrated by the flow chart shown in FIGS. 2 and 3. In FIG. 2, the flow chart illustrates the process of detecting the use status of every interrupt channel. It includes the following steps:

1. At the beginning of the detection, as indicated by block 30, disabling the central processing unit interrupt request 32.
2. Reading the IRQ status port 14 in n (preferably three) separate readings, and calculate the result by logic "and". If all three readings are the same value, the output of the "and" is the same as the input. If, however, the three readings are not the same, that may be in case of noise distorting one or more readings, the output will not be the same as the input. In other words, the triple reading and anding their results contributes to higher reliability to make sure no faulty results will be obtained due to extraneous occurrences. If the result is a logic "0", the interrupt channel is in use. This is shown by blocks 34–44. Specifically, block 34 indicates presetting the number of readings to be taken. Block 36 denotes subsequent presetting the interrupt channel's present status at high voltage. In block 38, there presented the substep of taking the present status of the interrupt channel and the content of the IRQ status port 14 and feeding them into logic (not shown), with subsequent calculating the result and inputting the same into the present status of the interrupt channel. The status of the interrupt channel and the contents of the IRQ status port 14 may or may riot coincide depending on operating conditions, including a potential effect of noise signals. In case of noncoincidence, "anding" signals having different values may or may not result in the value equal to the contents of the IRQ status port. Thus, the content of the IRQ status port 14 is brought into agreement with the present status of the interrupt channel so that they correspond to each other. In block 40, resetting the number of readings minus one is performed. In block 42, inquiring as to whether the number of readings is equal to zero takes place. If the answer is yes, the program proceeds to block 44 where determining whether the interrupt channel present status is at the high voltage is performed. If, however, the answer is no, the process returns to block 36 and the substeps between blocks 36 and 42 are to be repeated.
3. Writing the results of the calculation from step 2 into the IRQ force port 16 (substep 46). Reading the data contained in the IRQ status port 14 (substep 48) and comparing the present status with the content of the status port (substep 50) are then performed. If the logic for the IRQ force port 16 is "1" and the logic for the IRQ status port 14 is "0" (substep 52), the interrupt channel is set in substep 56 as an unused channel (the opposite result is characterized by substep 54), while all other interrupt channels are treated as used channels. For steps 44 and 52, it is to be understood that both branches yes/no can be used depending on the contents of the IRQ status port, which can equally be "0" or "1", and the present status of the interrupt channel.
4. Writing logic "0" into the IRQ force port 16 (as shown by block 58).
5. Activating the interrupt channel of the central processing unit, as shown by block 60.

In FIG. 2, block 32 indicates the step of closing the interrupt request of the central processing unit in order to avoid that during the process of the detection, any interrupt signal being sent to the central processing unit which may lead to errors or defective results. The loop shown between blocks 34 and 42 is intended to avoid undesirable effect of noise signals on the results of the detection. Substeps illustrated by blocks 58 and 60 are used to restore the add-on card to its condition prior to the detection in order to avoid the operation of the add-on card or the personal computer due to the detection procedure.

Figure 3:
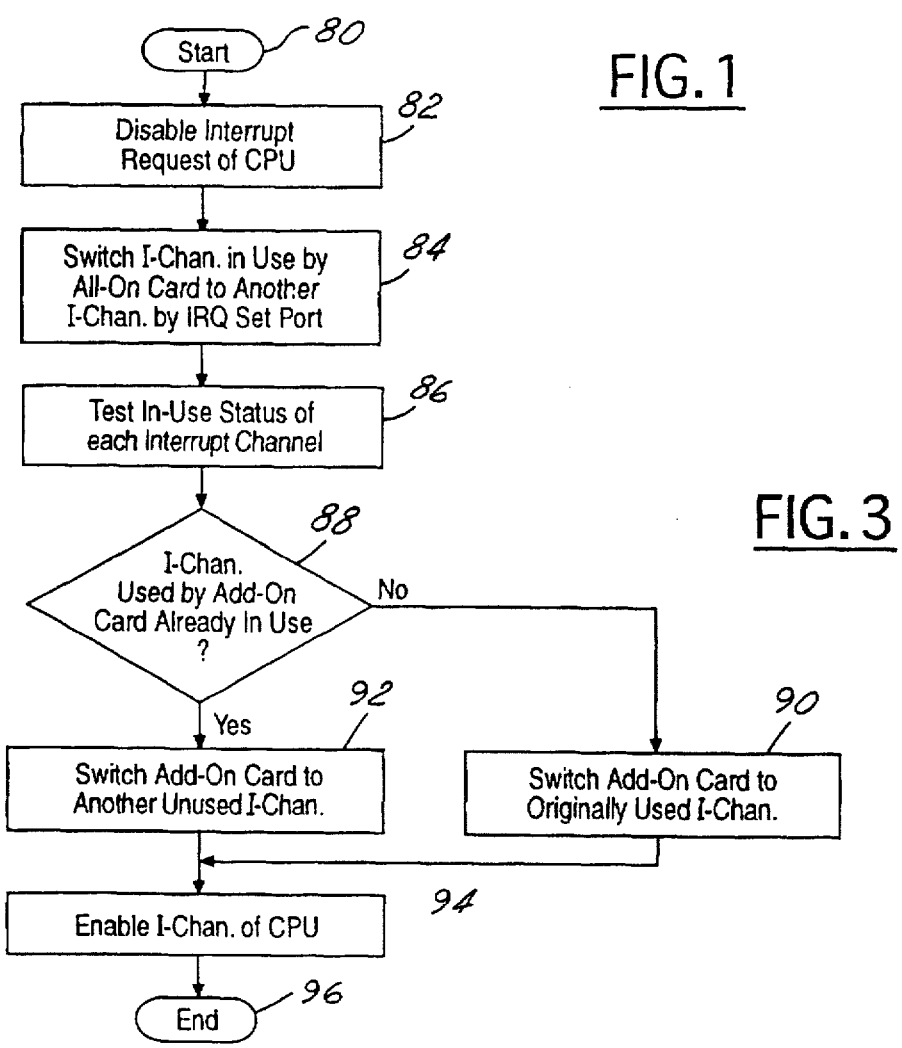
FIG. 3 is a flow chart of the program used by the present invention to detect whether a certain interrupt channel is in conflict with other interrupt channels on other add-on cards.

FIG. 3 shows a flow chart for the program to detect whether a certain interrupt channel is in conflict with another add-on card. The program includes the following steps:
1. Disabling the interrupt request of the central processing unit at the start of the detection (block 82).
2. Switching the interrupt channel used by the add-on card to another interrupt channel by using the IRQ set port 12 (FIG. 1). This step is illustrated by block 84.
3. Detecting the use status of each interrupt channel utilizing the program described in the above and shown in FIG. 2. This is illustrated by block 86 "Test in-use status of each interrupt channel". If the interrupt channel used by the add-on card is no longer in use (the no option of block 88), this indicates that the interrupt channel is not in interference with another add-on card. The add-on card is then switched back to the originally used interrupt channel through the IRQ set port 12 (FIG. 1) that is illustrated by block 90. Alternatively, by utilizing the program shown in FIG. 2, the add-on card is switched to another unused interrupt channel in order to ensure that there is no interference (substep illustrated by block 92 in FIG. 3).
4. Activating the interrupt channel in the central processing unit.

The present invention therefore utilizes three special I/O ports on an add-on card which include the IRQ set port, the IRQ status port, and the IRQ force port. The present invention further utilizes a program executed by the central processing unit to determine the conditions of the interrupt channels. It first detects whether each of the interrupt channels is in use and then detects whether a certain interrupt channel is in conflict with other interrupt channels on another add-on card.

While the present invention has been described in an illustrative manner, it should be understood that the terminology used is intended to be in a nature of words of description rather than of limitation.

Furthermore, while the present invention has been described in terms of one preferred embodiment thereof, it is to be appreciated that those skilled in the art will readily apply these teachings to other possible variations of the invention.

The embodiments of the invention in which an exclusive property or privilege is claimed are defined as follows:

1. A method to automatically detect a use status of an interrupt channel on a personal computer add-on card equipped with an IRQ set port, an IRQ status port, and an IRQ force port, said method comprising the steps of:
  (a) disabling an interrupt request on a central processing unit of said personal computer;
  (b) presetting a number of data input into said IRQ status port, said data characterizing a use status of said interrupt channel to be detected;
  (c) reading said preset number of data input into said IRQ status port;
  (d) executing a logic "and" calculation of a result of said reading said preset number of data input and a data characterizing a current status of said interrupt channel, and repeating said reading and calculating for a predetermined number of times;
  (e) writing a result from step (d) into said IRQ force port and reading data from said IRQ status port designating said interrupt channel as an unused interrupt channel if there is logic "1" in said IRQ force port and logic "0" in said IRQ status port;

(f) writing logic "0" into said IRQ force port; and (g) activating an interrupt channel gate of said central processing unit.

2. The method as claimed in claim 1, wherein said IRQ set port is used to preset an interrupt channel code of said add-on card, said IRQ status port is used to directly read the present status of said interrupt channel, said IRQ force port is used to ground said interrupt channel through a resistor when said channel has logic "1" and not to ground when said channel has logic "0".

3. The method as claimed in claim 2, wherein said resistor for grounding is a 1,000 Ohm resistor.

4. In a personal computer system with at least one add-on card, said at least one add-on card being equipped with an IRQ set port, an IRQ status port, and an IRQ force port, a method to automatically detect the use status of a plurality of interrupt channels, said method comprising the steps of:

(a) disabling an interrupt channel request on a central processing unit of said personal computer;

(b) presetting a number of data for a first interrupt channel of said plurality of interrupt channels into said IRQ status port, said data characterizing a use status of said interrupt channel to be detected;

(c) reading said preset number of data input from said IRQ status port; executing a logic "and" calculation of a result of said reading and data characterizing a current status of said interrupt channel, and replacing said current status data with said calculation result;

(d) repeating steps (b) and (c) for a predetermined number of times;

(e) writing a result of the step (d) into said IRQ force port and reading data from said IRQ status port, thus defining said first interrupt channel as an unused interrupt channel if there is logic "1" in said IRQ force port and logic "0" in said IRQ status port; writing logic "0" into said IRQ force port;

(f) performing the steps (b)–(f) for other interrupt channels of said plurality; switching said at least one add-on card to said first interrupt channel, if said first interrupt channel is not in use, or switching said at least one add-on card to next unused interrupt channel of said plurality, if said first interrupt channel is in use; and (g) activating said interrupt channel request of said central processing unit.

5. The method as claimed in claim 4, wherein said IRQ set port is used to preset an interrupt channel code of said add-on card, said IRQ status port is used to directly read the present status of said interrupt channel, said IRQ force port is used to ground said interrupt channel through a resistor when said channel has logic "1" and not to ground when said channel has logic "0".

6. The method as claimed in claim 5, wherein said resistor for grounding is a 1,000 Ohm resistor.

* * * * *